March 13, 1962 — D. D. WILLIAMS — 3,025,142
METHOD AND MEANS OF DETECTING AMMONIA AND AMINE VAPOR
Filed Oct. 30, 1959
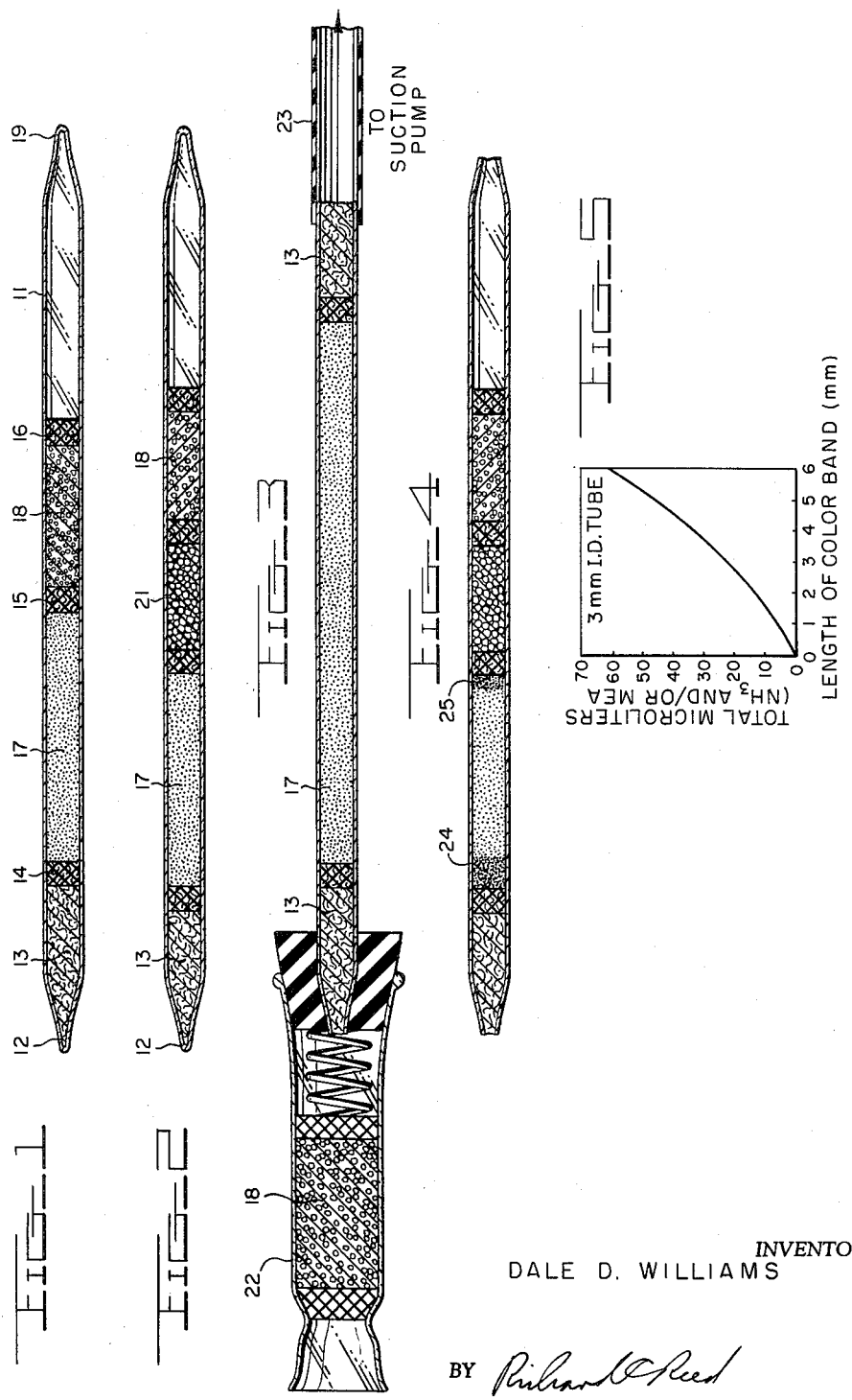
INVENTOR
DALE D. WILLIAMS
BY Richard C. Reed
ATTORNEY United States Patent Office 3,025,142
Patented Mar. 13, 1962

3,025,142
METHOD AND MEANS OF DETECTING AMMONIA AND AMINE VAPOR
Dale D. Williams, McLean, Va., assignor to the United States of America as represented by the Secretary of the Navy
Filed Oct. 30, 1959, Ser. No. 849,992
12 Claims. (Cl. 23—232)
(Granted under Title 35, U.S. Code (1952), sec. 266)

The invention described herein may be manufactured and used by or for the Government of the United States of America for governmental purposes without the payment of any royalties thereon or therefor.

This invention relates to a method of and means for detecting small concentrations of ammonia and amine vapors. In particular, the invention is useful for determining quantitatively extremely small concentrations of a primary amine vapor in air or in other gas.

The use of monoethanol amine (MEA) in carbon dioxide scrubbers aboard the modern submarine made imperative the development of a method and means for routine detection of amine vapor. The presence of monoethanol amine (MEA) in the confined atmosphere of a submarine presents a serious problem in view of the low toxic limit of 1 p.p.m. which has been established for continuous exposure to this vapor in a contaminated atmosphere. A simple and reliable method for determining the concentration of MEA at the level of 1 p.p.m. or less is, therefore, of the utmost importance.

The closed cycle of a submarine atmosphere imposes severe limitations on known methods of detection: Space and manpower govern the extent and complexity of any instruments that may be carried aboard a submarine. The presence of other contaminants further limits the use of many applicable analytical methods. For example, ammonia is similar in most reactions to monoethanol amine and to other amines, and it is also one of their principal degradation products. Hence, any method which is developed for MEA detection must also account for or eliminate interference from this simultaneously occurring gas.

It is an object of the present invention to provide a sensitive color indicator for detecting small concentrations of ammonia and/or organic amine vapor.

It is another object of this invention to provide a simple and reliable method for determining the amount of amine impurity in a sample of air or other gas.

It is a further object of this invention to provide a quantitative test that produces sharp color bands of varying band widths relative to the amount of impurity in a contaminated atmosphere.

It is still a further object to provide a novel indicator in which the linear measurement of color bands discriminates minute differences in concentration and provides for accurate calibration in the order of a few parts per million.

And a still further object is to provide an indicator having improved structural features which contribute to the stability and sensitivity of said indicator.

Other objects and advantages of the present invention will in part be obvious and in part appear hereinafter.

The present invention comprises a novel method and means for detecting ammonia and/or amines, mainly primary amines, by a colorimetric reaction in which a white powder, contained in a glass tube or cartridge, develops a blue color band upon exposure of the white powder material to the action of ammonia and/or a primary amine vapor and upon subsequent heating of the tube and powder sufficiently to produce the blue band. The color change occurs linearly in the tube space, along the path of the enclosed powder and nearest the inlet opening of said tube; the amount of powder that is affected thereby depends upon the quantity of ammonia and/or amine with which it comes in contact.

The ninhydrin reaction was previously used as a "wet" method in obtaining the blue color in dilute solutions of α-amino acids. The reaction, which consists in warming α-amino acids with triketohydrindene hydrate (ninhydrin) until a blue color appears, has not been used as a specific test, for it was soon discovered that all ammonium salts and many organic bases also give a positive test. In contrast to the prior art, the present indicator consists of a tube supporting therein the substantially dry ingredients of ninhydrin on an inert carrier, and the presence of the —NH$_2$ radical is detected by passing gaseous samples through the dry ingredients in the tube. Gaseous samples which are now tested by the novel ninhydrin indicator are contaminated with relatively low molecular weight amines and their chief degradation product, ammonia; the previous objection therefore to the use of ninhydrin in solution chemistry as a general indicator has been overcome substantially by eliminating α-amino acids, ammonium salts, many organic bases, and in effect all amine substances not ordinarily encountered in air streams. The intended use of the indicator in an environment containing known reactants further delimits the general nature of ninhydrin.

It has now been discovered in accordance with the present invention that the indicator tube containing activated silica gel may be selectively employed to determine the concentration of an amine, for instance, monoethanol amine (MEA), from a mixture containing both MEA and ammonia. The ninhydrin-silica gel is equally sensitive to NH$_3$ and MEA, and the color band formed in a tube containing ninhydrin-silica gel is contributed by both gaseous components each in proportion to its concentration on a volume basis. If the two components are initially passed through solid ortho boric acid, it has now been discovered that the MEA is effectively filtered from the gas stream while the NH$_3$ is permitted to pass through. Thus, by exposing one end of a tube containing ninhydrin-silica gel directly to a sample of NH$_3$ and MEA and then exposing the opposite end of the tube to an equal quantity of the same sample which initially passes over boric acid, the color band widths produced at opposite ends of the activated gel, after sufficient heating, are found to be proportional to the amount of NH$_3$ and/or MEA in the sample. The color band at the "unfiltered" end of the tube represents total NH$_3$—MEA; the color band at the "filtered" end of the tube represents NH$_3$ gas alone. Through appropriate calibration the amine concentration is obtained from the difference of the measured quantities.

Indicator tubes prepared in accordance with the present invention are illustrated in the accompanying drawings, in which:

FIGURES 1, 2 and 3 are longitudinal cross sections through indicator tubes comprising various embodiments of the invention;

FIGURE 4 is a longitudinal cross section through an indicator tube showing color bands produced according to the invention.

FIGURE 5 shows a calibration graph which relates the color band measurement to concentrations.

Referring now to FIG. 1 in the drawing, a clean glass tube or cartridge 11, preferably of Pyrex composition, has one end thereof suitably closed by drawing out and sealing to form a fragile tip 12. An air pervious retaining material 13, such as glass wool or ground glass of about 16–30 mesh may be used as a spacer and is also found to be useful in creating a uniform flow pattern in the gal section of the tube. This material may be eliminated if a sufficiently long glass wool plug 14 is substituted in its place. Glass wool plugs 14, 15, and 16 used herein are spacers which are pervious to vapor flow and have sharp, straight edges that facilitate in measuring color band widths. A section of ninhydrin-silica gel reagent 17 is retained by wool plug 15, and a section of C.P. ortho boric acid crystals 18 (30–60 mesh) is retained by another wool plug 16. In filling the tube with these materials, the operation should be accompanied with sufficient tamping to insure firm layers of uniform density. The open end of the tube is drawn out and sealed to form fragile tip 19, care being exercised to prevent the ortho boric acid from becoming heated above 25–30° C. Tubes sufficiently long, as shown in FIG. 1, enable the sealing operation to be performed at a safe distance from the boric acid.

When silica gel and boric acid sections are alone provided, as in FIG. 1, the tube is stored at a temperature of about 2–4° C. in order to preserve its sensitivity. It appears that a vapor state transport of boric acid actually occurs at room temperature, apparently through the agency of water moving to and from the silica gel, which destroys the ninhydrin or prevents full color formation and sharp interfaces. The invention therefore further provides for an intervening layer of an alkaline material inserted between the boric acid and the silica gel of which a preferred embodiment is shown in FIG. 2.

The modified tube contains therein between the silica gel section 17 and the boric acid crystals 18, an intervening layer 21 (FIG. 2), which is an alkaline agent, such as calcium carbonate, anhydrous lithium hydroxide and other similar materials which do not become deliquescent in the tube. With this arrangement the tube need not be refrigerated, since any ambient boric acid vapor is at once neutralized in the intervening alkaline layer, and boric acid destruction of ninhydrin is effectively prevented.

In a further embodiment, shown in FIG. 3, the boric acid filter may be segregated in a separate container, such as the drier tube 22, which is of any desired size and contains a sufficiently large quantity of ortho boric acid 18 so that the tube may be used repeatedly with any number of gel tubes. The detector tube according to this embodiment contains the ninhydrin-silica gel positioned between pervious glass plugs and glass wool 13 and cannot, therefore, be affected by the destructive nature of boric acid under prolonged storage. As shown in FIG. 3, the boric acid container 22 becomes attached to an open-end indicator tube during actual operation, wherein pump line 23 draws a sample over the ortho boric acid 18 into the gel tube.

PREPARATION OF NINHYDRIN-SILICA GEL

The triketohydrindene hydrate (ninhydrin) is preferably suspended on particles of silica gel, or any other similar inert carrier which is also a good absorbent material. Pure silica gel, screened to 35–60 mesh, has been found to be particularly useful for the present indicator, both in drying the impregnated gel to the desired moisture content and also in providing a grain size which can be packed tightly, yet retain a certain optimum air flow characteristic in the tube.

The gel is initially dried thoroughly at 110° C. for 24 hours. To a weighed quantity of dry silica gel, a 2% addition of triketchydrindene hydrate by weight is combined by dissolving the reagent in just enough distilled water to completely wet the silica gel. Excess water should be avoided for the mixture since the water content is not removed by the usual rapid methods of a suction line or an over drier; the water content is preferably removed from the mixture by passing clean air at 25° C. at a relative humidity of 50–60%. It was found that complete removal of water from the silica gel by the usual methods of drying resulted in a "dry" tube which did not respond equally to the various humidities. A "dry" tube absorbs water during use and the color indicator varies in intensity and sharpness with change in moisture content. Gel which has been equilibrated with air at 25° C. and 50–60% R.H. is found to inhibit further moisture absorption and may be used with air streams that vary 30–80% in relative humidity. Activated gel prepared in this manner is free-flowing, like dry sand; it may be stored in closed, brown bottles until ready for use.

The present indicator may be constructed in accordance with any of the embodiments described above and in different sizes of tubes and amounts of indicating gel therein. The sensitivity of the present indicator depends on such variables as (1) concentration of the ammonia or amine, (2) length of sampling time, (3) diameter of the tube, (4) rate of flow, (5) resistance to flow across the tube. The accuracy of the device is considerably enhanced, for example, when the sampling time is sufficiently large to detect exceedingly small concentrations of impurities, and also when the flow rate of sample is sufficiently low to assure complete reaction with the activated gel. The tube diameter, moreover, provides a measure of the sensitivity of the device: A reduction in the diameter results in a longer color band per unit of contaminant, for the reaction is quantitative on a gel volume basis.

As indicator tube designed to measure MEA in the range of 1 p.p.m., and even less, has an inside diameter of 3 mm. in order to provide a substantial linear measurement of color bands. A useful precise range of I.D. is between about 2 to 6 mm. for accurate quantitative determinations. Tube lengths and the amount of gel enclosed therein are based on the concentration of impurity and on the sampling time. Normally, a length section of 20 mm. of silica gel in a tube of 3 mm. I.D. having a flow rate of about ⅓ to about ¼ liter per minute with a flow period of 10 to 20 minutes will sample about 2.5 to 7 liters and will have color band widths of .25 mm. to .7 mm. for each part per million of impurity.

While a 3 mm. diameter tube is considered in the following example for the purposes of this description coupled with definite lengths of activating gel and boric acid, it will be understood that this is only illustrative and not restrictive of the invention.

Example

Tubes of the type shown in FIGS. 1 and 2 may be prepared of Pyrex tubing of 4 inch length with 3 mm. I.D., having therein a 20 mm. length section of impregnated silica gel of 35–60 mesh in accordance with the teachings of the present invention. The boric acid filter which is of 30–60 mesh is present in a 10 mm. length section, while the anhydrous calcium carbonate (30–60 mesh) of FIG. 2 is added in a 10 mm. length section. The tube dimensions and ingredients therein provide a tube in which the pressure drop is not more than about 100 mm. Hg @ ⅓ liter per minute.

When it is desired to determine the concentration of an amine and ammonia impurity in an air or gas sample, both ends of the ninhydrin tube are snapped off, as shown in FIG. 4, and the tube is connected by any convenient means to a suction line, process stream, by-pass, or the like, which impels air or other gas that is to be sampled through the indicator tube. The sampling is regulated to a flow rate less than about a liter per minute. Flow rates adjusted to about ⅓ or ¼ liter per minute for periods of about 10 to 20 minutes. For instance, a flow of ⅓ liter/min. for a time interval of 15 minutes will sample 5 liters of air in 15 minutes. At the end of the timed cycle, the tube is reversed, end for end, and an equal volume of air passes in the opposite direction. The tube is then removed and heated to 95–100° C. for at least 2 minutes. The heating should preferably be carried out in about 2 to 4 minutes in a regulated oven, instrument sterilizer, top of a double boiler with water boiling in the lower compartment, or under an infrared heat lamp. At the end of the heating period, the tube is cooled to room temperature and both ends of the silica gel portion is examined for dark blue bands (24 and 25, FIG. 4).

If both color bands are equal in width, obviously the sample contains only ammonia. If only the unfiltered end 24 (the end which is not affected by the boric acid) is colored, the sample contains only MEA. If both ends are colored, but with bands of different widths, as shown in FIG. 4, the sample contains both ammonia and MEA. The widths of the colored bands are measured preferably to the nearest 0.1 mm.

The concentration in microliters corresponding to the color band width is read from a calibration graph, shown in FIG. 4. This quantity divided by the volume of air sampled (in liters) provides for the value of "parts per million of air particles." The value thus obtained from the boric acid end of the tube is the ammonia concentration of the sampled air. The combined or total $NH_3$—MEA value similarly obtained for the unfiltered end of the tube, minus the value obtained for $NH_3$ gives the MEA concentration of the sampled air.

It is to be understood that the invention is not to be limited to the specific example herein given as it is obvious that this may be varied without departing from the spirit and scope of the invention as defined in the accompanying claims.

What is claimed is:

1. A sealed transparent container with easily breakable ends having disposed therein a quantity of pure silica gel impregnated with triketohydrindene hydrate, pervious plug means disposed at the outer ends of said silica gel, and said silica gel being pervious to the passage of an air sample.

2. A colorimetric indicator comprising a sealed transparent container adapted to be opened at its ends, a quantity of silica gel impregnated with a substantially dry residue of a solution of triketohydrindene hydrate, pervious plug means disposed at the outer ends of said silica gel, said silica gel being pervious to the passage of an air sample.

3. A colorimetric indicator comprising a sealed glass tube with ends adapted to be attached to an air impel system, a quantity of silica gel impregnated with a substantially dry residue of a solution of triketohydrindene hydrate, pervious plug means disposed at the outer ends of said silica gel, the contents in said container being pervious to the passage of an air sample.

4. A colorimetric indicator comprising a sealed glass tube with easily breakable ends, disposed within said tube on a quantity of pure silica gel the substantially dry residue of impregnation of a solution of triketohydrindene hydrate, a quantity of solid ortho boric acid, pervious plug means separating said ortho boric acid from said silica gel, additional pervious plug means disposed at the outer ends of said silica gel and said boric acid, said contents being pervious to the passage of an air sample.

5. A colorimetric indicator comprising a sealed glass tube with easily breakable ends, disposed within said tube on a quantity of pure silica gel the substantially dry residue of impregnation of a solution of triketohydrindene hydrate, a quantity of a nondeliquescent alkaline agent, pervious plug means separating said alkaline agent from said silica gel, a quantity of ortho boric acid, additional pervious plug means separating said alkaline agent from said boric acid, additional pervious plug means disposed at the outer ends of said silica gel and said boric acid, the contents of said tube being pervious to the passage of an air sample.

6. A colorimetric indicator according to claim 5 in which the alkaline agent is of the group of compounds including calcium carbonate and anhydrous lithium hydroxide.

7. An indicating composition adapted for ammonia and amine analysis consisting essentially of a white power of pure silica gel combined with the substantially dry residue of impregnation of a solution of triketohydrindene hydrate wherein said silica gel and solution are dried by passing filtered air at 25° C. and at 50 to 60% relative humidity.

8. The method of detecting the presence of ammonia and amine vapor in a gaseous medium which consists of subjecting silica gel impregnated with triketohydrindene hydrate to a sample of said gaseous medium and subsequently heating said silica gel sufficiently to produce coloration.

9. The method of detecting the presence of ammonia gas in a gaseous medium containing ammonia and amine vapor which consists of subjecting a sample of said gaseous medium to the action of ortho boric acid powder to remove the amine vapor therefrom, passing said sample through a tube containing silica gel with the substantially dry residue of impregnation of a solution of triketohydrindine hydrate and subsequently heating said tube sufficiently to produce coloration.

10. A colorimetric method for determining ammonia and amine vapor which consists of passing a first gaseous sample containing a relatively small concentration of ammonia and amine vapor through one end of a tube containing therein a section of silica gel with the substantially dry residue of impregnation of a solution of triketohydrindene hydrate, at a predetermined flow rate and for a definite duration, passing a second gaseous sample through the opposite end of said tube at said predetermined flow rate and for said duration, said second gaseous sample being subjected initially to the action of boric acid powder to remove the amine therefrom and then passing said sample through said section of silica gel, heating said tube and contents subsequently to produce color bands at opposite ends of said section of silica gel and measuring the widths of said color bands to determine the relative amounts of ammonia and amine vapor.

11. A colorimetric method for determining ammonia and amine vapor which consists of passing a gaseous sample containing therein a relatively small concentration of ammonia and amine vapor through a transparent tube containing therein a section of silica gel with the substantially dry residue of impregnation of a solution of triketohydrindene hydrate at a predetermined flow rate and for a definite duration, heating said tube and silica gel sufficiently to produce a color band in said silica gel section and measuring the width of said color band to determine the amount of ammonia and amine vapor.

12. A colorimetric method for determining ammonia which consists of passing a gaseous sample containing a relatively small concentration of ammonia and amine vapor through a tube containing a section of boric acid powder and a section of silica gel with the substantially dry residue of impregnation of a solution of triketohydrindene hydrate at a predetermined flow rate and for a definite duration, said sample contacting said boric acid powder before being brought into contact with said silica gel, heating said tube and contents to a temperature sufficient to produce a color band in said silica gel section and measuring the width of said color band to determine the amount of ammonia.

References Cited in the file of this patent

FOREIGN PATENTS 431,809     Great Britain _____ July 16, 1935

OTHER REFERENCES

Payne et al.: "Anal. Abst." 2,146 (1955), or "Arch. Biochem. Biophys. 52 (1), 1–4 (1954).